(No Model.)
U. BACHMANN.
IMPREGNATING LIQUIDS WITH GASES.
No. 481,838. Patented Aug. 30, 1892.
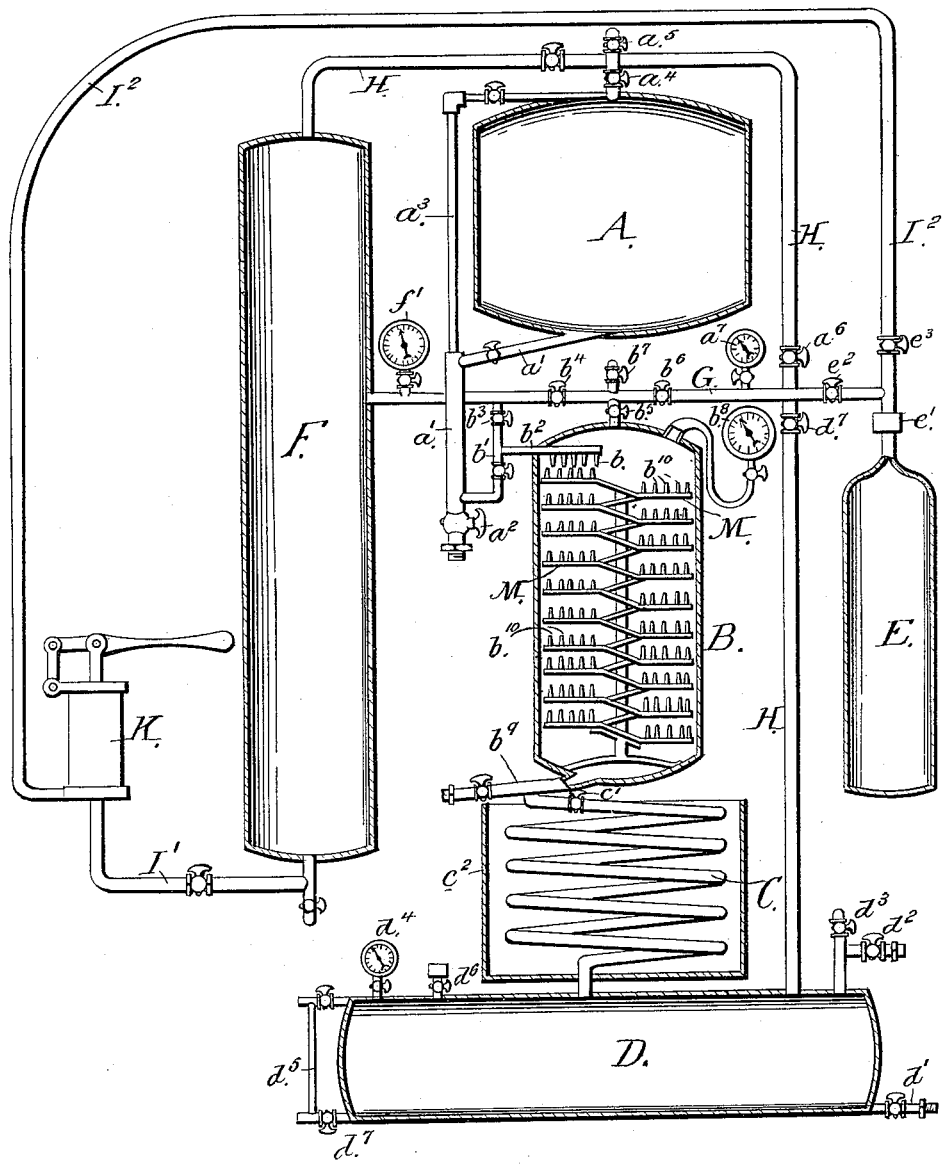
WITNESSES
Thomas J. Rout Jr.
Chapman Fowler
INVENTOR
Ulrich Bachmann,
by Dewey & Co.
Attorneys

UNITED STATES PATENT OFFICE.

ULRICH BACHMANN, OF MISSION SAN JOSÉ, CALIFORNIA.

IMPREGNATING LIQUIDS WITH GASES.

SPECIFICATION forming part of Letters Patent No. 481,838, dated August 30, 1892.

Application filed June 10, 1891. Serial No. 395,832. (No model.)

*To all whom it may concern:*

Be it known that I, ULRICH BACHMANN, a citizen of the United States, residing at Mission San José, Alameda county, State of California, have invented an improvement in Impregnating Liquids with Gases; and I hereby declare the following to be a full, clear, and exact description of the same.

My invention relates to the art of and apparatus for impregnating liquids with gases, and especially to the class of apparatus for automatically charging liquids with carbonic-acid gas.

My invention consists in charging and confining within the liquid-receiving vessel or vessels a given supply of carbonic-acid gas under pressure, charging the liquid-reservoir with a given pressure of the gas, and feeding the liquid from the reservoir to the receiving vessel or vessels by allowing it to flow therein, whereby it displaces the gas in said vessel or vessels, increasing its pressure therein and checking automatically the continued flow of the liquid until a portion of the gas is absorbed, and the pressure thereby reduced sufficiently to again permit the flow, and so on until the liquid has all passed to the receiving vessel or vessels and the gas therein is completely absorbed by the liquid.

My invention also consists in the novel apparatus hereinafter described, and specifically pointed out in the claims.

The object of my invention is to provide a simple and effective method and means for thoroughly and automatically charging liquid with carbonic-acid gas.

Referring to the accompanying drawing for a more complete explanation of my invention, the figure is a vertical section of my apparatus.

A is the supply vessel or reservoir for the liquid which is to be impregnated with carbonic-acid gas. A pipe $a'$, controlled by a cock $a^2$, forms an inlet and outlet of said reservoir. Pipe $a'$ has a branch pipe $b'$, which has an extension $b^2$ into the vessel B. The end of extension-pipe $b^2$ is formed or provided with several small nozzles $b$ on its lower side. The branch pipe $b'$ is also connected with the gas-pipe G by a faucet-controlled pipe $b^3$. The reservoir-vessel A is also provided with a water-gage $a^3$, a gas and air pipe and faucet $a^4$, which connects the vessel with gas-pipe H, and this pipe is also connected with all the other vessels in the apparatus.

$a^5$ is an air-faucet.

$a^6$ is a stop-faucet in pipe H.

$a^7$ is a manometer for vessel A and for the gas-flask E.

The vessel B is located below the reservoir-vessel A. It has a connection $b^5$ with the gas-pipe G, an air-faucet $b^7$, and stop-faucets $b^4$ and $b^6$, a manometer $b^8$, and on its lower part it has an outlet-pipe $b^9$.

Upon the inside of the vessel B is a spirally-shaped conveyer-plate M, consisting of a plate winding about the interior of the vessel and provided on its surface with parallel flanges, which form a series of parallel channels $b^{10}$, extending from the upper portion of the vessel spirally downward to its lower portion. With the upper ends of these channels the nozzles $b$ of the pipe $b^2$ communicate and are adapted to discharge the liquid into them.

C is a coiled pipe connected at its upper end with the outlet-pipe $b^9$ of vessel B and controlled by a cock $c'$. This coiled pipe is situated within an ice-box $c^2$, and the lower end of the pipe communicates with the final receiving-vessel D. This vessel is a liquid-storage vessel. It has an outlet $d'$, gas-faucet $d^2$, air-faucet $d^3$, manometer $d^4$, water-gage $d^5$, safety-valve $d^6$, and stop-faucet $d^7$.

F is a gas-storage vessel. It is connected with all the other vessels by gas-pipes H and G. It is also provided with a manometer $f'$.

E is the carbonic-acid-gas flask. It has a pressure-regulating valve $e'$ and stop-faucets $e^2$ and $e^3$.

K is a gas-pump by which stored-up gas from vessel F can be pumped into flask E. Pump K is connected with the gas-storage vessel F by pipe $I'$ and with gas-flask by pipe $I^2$.

The operation of this apparatus is as follows: To start it, it must first be emptied of the air and filled with carbonic-acid gas. To do this, the vessels are first filled with water, then the water is allowed to run out and gas from the gas-flask E is allowed to flow in and take the place which the water has vacated. After the apparatus is emptied of the water and is full of gas the reservoir-vessel A is filled with the liquid which is to be impregnated. This is effected by pumping the liquid through the inlet-pipe $a'$. The gas in vessel A is forced or allowed to pass out into the gas-storage vessel F or down into vessels B and D, according to circumstances. When vessel A is filled with the liquid, all the connections with the gas-storage vessel F are closed, and gas from the flask E, which contains liquified gas under very high pressure, is allowed to enter the vessels and pipes B, C, and D. The quantity of gas admitted to these vessels and pipe is regulated to the amount which it is desired the liquid to absorb. For instance, if it is desired that it shall be impregnated with five volumes of gas that amount of gas from flask E is allowed to enter the vessels B and D until the manometers show a pressure of five atmospheres. After this is done all the gas connections between vessels B and D and vessel A and flask E are shut off, and only the liquid connection $a'$ and $b'$ between vessels A and B are left open. The pressure-regulating valve $e'$ of the flask E is now used to produce a steady gas-pressure of, say, five atmospheres in the vessel A. The liquid from vessel A has a tendency now to pass down through the pipe $a'$ and up through the branch pipe $b'$ and $b^2$ into the vessel B. The liquid when running out of the small nozzles $b$ of pipe $b^2$ will run into the grooves or channels $b^{10}$ of the spiral-shaped conveyer-plate M, and in these channels or grooves it will run downward until it has reached the bottom of the vessel. From here it will run out of this vessel through the outlet $b^9$ and down through the coil-pipe C into the vessel D; but as all the gas-outlets of vessels B and D are closed this flow of the liquid will continue only a short time—that is, only until the pressure of the confined gas in the vessels B and D is increased by displacement until it reaches a balance with the pressure above in vessel A, whereupon the flow of liquid will stop; but this gas in vessels B and D will commence to be absorbed by the liquid, and as the absorption continues its pressure is once more reduced, whereby the pressure in said vessels becomes less than the pressure in the vessel A above, and consequently the flow of liquid again begins and continues until by displacement the pressure of the remaining gas in vessels B and D is once more increased to balance the pressure above, when the flow of liquid will stop; but as more of the gas in B and D is absorbed, whereby the pressure is reduced, the flow will again take place, and so on until the liquid has all passed down into the vessel D and has absorbed all the gas which has been confined within the vessels B and D. Thus the absorption of the gas by the liquid is automatic and is thoroughly effected, both by reason of the gas in vessel B after being displaced having to pass upwardly through the same channels that the liquid is passing downwardly in—that is to say, it must and can escape upwardly only through the coil-pipe C, and also because of the large surface of the liquid in the channels $b^{10}$ of vessel B exposed to the pressure of the gas. To avoid this confined gas escaping from vessel B through the nozzle $b$, I have made the branch pipe $b'$ with a downward curve, which forms a trap to confine the gas.

Carbonic-acid gas when under very high pressure and given an opportunity to get free develops a low degree of temperature. In my apparatus this peculiarity and the exposure of a large surface of the liquid through the long run or flow through the channels $b^{10}$ of the spiral conveyer result in the absorption of a considerable amount of gas by the liquid. When it passes down through the coil-pipe C into vessel D, it displaces the gas contained in that vessel, and this gas has no other way in which to escape except upwardly through the coil-pipe C. As this pipe is located in an ice-box, not only the downwardly-flowing liquid will receive a low temperature and is in a great measure more capable of absorbing carbonic-acid gas while in contact with the upward-flowing gas in the pipe, but also the gas when entering the vessel B will have such a low degree of temperature that it will greatly hasten its own absorption by the liquid.

Having thus described my invention, what I claim as new, and desire to secure by Letters Patent, is—

1. An apparatus for charging liquid with gas, comprising liquid-supply and receiving vessels on different levels connected with each other and a gas-reservoir connecting with both vessels, whereby the flow of liquid into the receiving-vessel displaces the gas therein and balances the pressure in the supply-vessel to automatically check and regulate the flow of liquid between said vessels, substantially as herein described.

2. In an apparatus for charging liquids with gas, a receiving-vessel to which the gas to be absorbed is supplied, a spirally-wound conveyer-plate in said vessel having upon its surface a series of parallel channels, and a liquid-supply pipe entering the top of said vessel and having a series of nozzles adapted to discharge the liquid into the upper ends of the channels of the conveyer-plate, substantially as herein described.

3. In an apparatus for charging liquids with gas, a receiving-vessel to which the gas to be absorbed is supplied, said vessel having within it a spirally-wound conveyer-plate with a series of channels upon its surface, a liquid-supply pipe entering the top of the vessel and having a series of nozzles communicating with the upper ends of the channels, a liquid-reservoir vessel having an outlet-pipe, and a branch pipe connecting said outlet-pipe with the supply-pipe and forming a trap whereby the gas from the receiving-vessel is prevented from escaping into the reservoir-vessel, substantially as herein described.

4. In an apparatus for charging liquids with gas, the reservoir-vessel containing the liquid, the receiving-vessel B, having the spirally-wound conveyer-plate with grooves or channels, the supply-pipe with nozzles by which the liquid from vessel A is supplied to the channels of the conveyer-plate, the coil-pipe C, communicating with the lower end of the receiving-vessel B, the liquid-storage vessel D, communicating with the lower end of the coil-pipe, and a gas-flask for supplying the gas to said vessels, substantially as herein described.

5. An apparatus for charging liquids with gas, consisting of the liquid-reservoir vessel A, the receiving-vessel B, having the spirally-wound conveyer-plate, the connection between the vessels A and B, by which the liquid is supplied to the vessel B, a coil-pipe C, communicating with the lower end of vessel B, the ice-box about said coil-pipe, the liquid-storage vessel D, communicating with the lower end of the coil-pipe, the gas-flask E, communicating with vessels A and B, the gas-storage vessel F, and suitable cocks controlling the connections, substantially as herein described.

In witness whereof I have hereunto set my hand.

ULRICH BACHMANN.

Witnesses:
LINCOLN SONNTAG,
WM. F. BOOTH.